Nov. 30, 1937.　　　　O. M. OLSON　　　　2,100,867

AIR CONDITIONING SYSTEM

Filed July 31, 1936

Inventor:
Olaf M. Olson,
by Harry E. Dunham
His Attorney

Patented Nov. 30, 1937

2,100,867

UNITED STATES PATENT OFFICE 2,100,867

AIR CONDITIONING SYSTEM

Olaf M. Olson, Margate, N. J., assignor to General Electric Company, a corporation of New York Application July 31, 1936, Serial No. 93,613

7 Claims. (Cl. 62—129)

My invention relates to air conditioning systems and particularly to such systems which employ a reversible refrigerating machine for cooling or heating the air within a room or other enclosure.

It is an object of my invention to provide a system for heating the air within an enclosure including an improved inverted refrigerating machine arranged to utilize fully the maximum capacity of the refrigerant compressor, without increasing the amount of the refrigerant handled by the compressor.

Another object of my invention is to provide an air conditioning system employing a reversible refrigerating machine for cooling and for heating the air within an enclosure and including an improved arrangement for utilizing the full capacity of the compressor when heating the air to be conditioned.

Further objects and advantages of my invention will become apparent as the following description proceeds, and the features of novelty which characterize my invention will be pointed out with particularity in the claims annexed to and forming a part of this specification.

Figure 1:
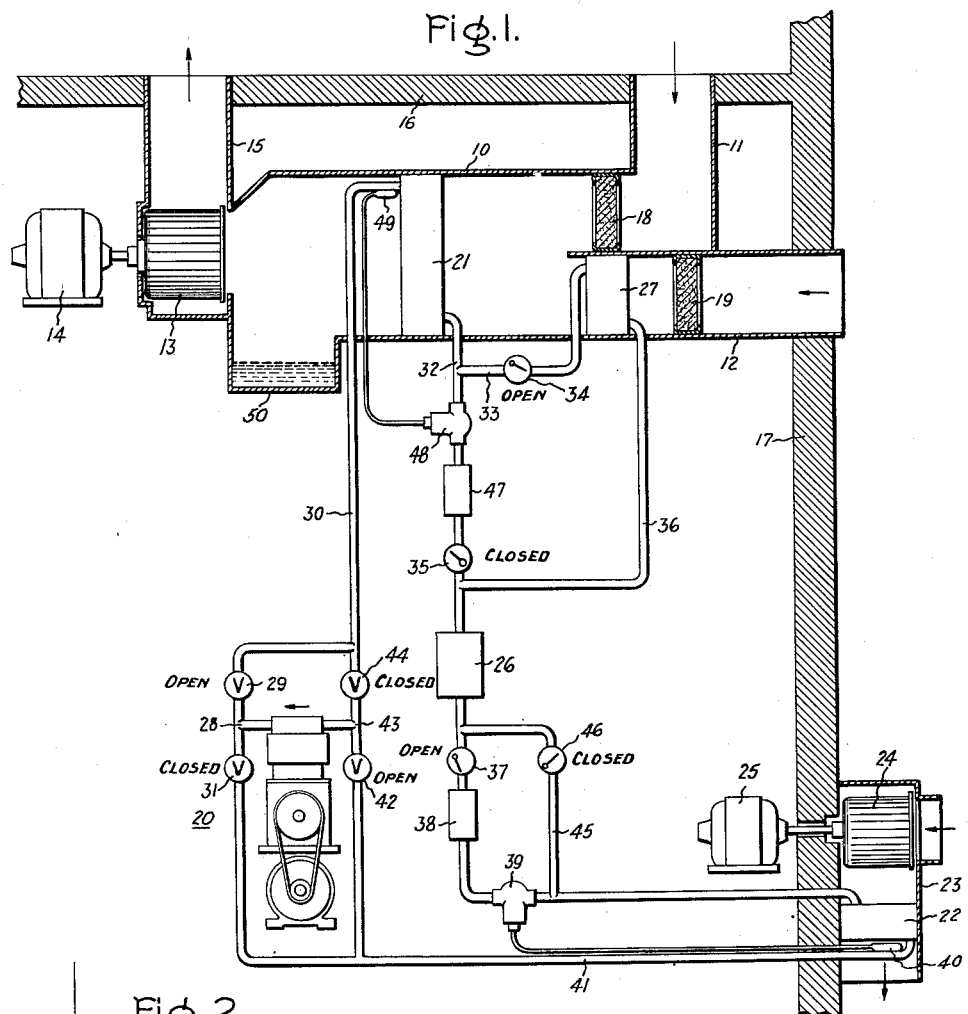
Figure 2:
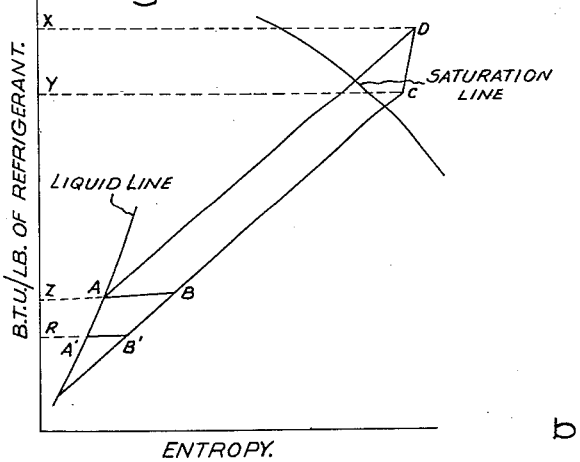

For a better understanding of my invention, reference may be had to the accompanying drawing in which Fig. 1 is a diagrammatic view of an air conditioning system embodying my invention, and Fig. 2 is a Mollier diagram of the cycle of operation of the refrigerating machine shown in Fig. 1.

Referring now to Fig. 1, I have shown an air conditioning system including a duct 10 provided with an inlet 11 for admitting to the duct air withdrawn from an enclosure to be conditioned and an inlet 12 for admitting to the duct 10 fresh air from outside the enclosure. The fresh and withdrawn air are drawn into the duct and mixed therein by operation of a fan 13 driven by a motor 14, and the mixture of air is discharged from the duct into the room through an outlet 15. The inlet 11 and outlet 15 pass through a wall 16 of the enclosure to be conditioned and communicate with the enclosure. The fresh air inlet 12 passes through a wall 17, which is the outer wall of the building, so that fresh air is admitted to the inlet 12. The air admitted to the duct 10 through the inlets 11 and 12 is cleaned by passing through filters 18 and 19, respectively.

In order to heat or cool the air circulating through the duct 10 I provide a reversible refrigerating machine including a motor driven compressor 20, a condenser or heat exchanger 21 arranged in the duct 10, and an evaporator or heat exchanger 22 arranged in a duct 23 outside the wall 17. Outside air is circulated through the duct 23 by operation of a fan 24 driven by a motor 25. The refrigerating machine is shown with the reversing valves thereof set for operation to utilize the heat exchanger 21 as a condenser and heat the air passing through the duct 10. The valves are indicated as open or closed, according to their position during this heating operation. When the refrigerating machine is being used to heat the air passing through the duct 10 the refrigerant compressed by operation of the compressor 20 flows to the condenser 21 where it is liquefied on being cooled by the air passing thereover which is thus heated. The liquid is collected in a liquid receiver 26, from which it flows in regulated quantities to the evaporator 22, where it is evaporated upon absorption of heat from the outside air circulating thereover, the vaporized refrigerant being returned to the compressor.

The liquid refrigerant which flows from the condenser 21 is at a temperature considerably higher than that of the air circulating through the duct. It is desirable that the liquid refrigerant admitted to the expansion valve be at a relatively low temperature in order that it will not be necessary to utilize a portion of the heat absorbing capacity of a refrigerating machine to remove heat from the liquid passing through the valve. In some machines this heat is removed by a heat exchanger whereby the cooled gas withdrawn from the evaporator is utilized to cool the liquid. This arrangement, however, superheats the gas and makes it necessary for the compressor to handle a greater volume of gas. In the air conditioning system described herein I utilize the heat in the condensed liquid to preheat the fresh air admitted to the duct 10. This cools the liquid refrigerant and at the same time performs useful work in heating the air to be conditioned. As a result, the total heating capacity of the system is increased without the necessity of increasing the capacity of the compressor, since the vapor drawn into the compressor remains at the same temperature and pressure as would be the case if the liquid were admitted directly to the flow controlling valve without additional cooling.

In order to cool the refrigerant liquefied in the condenser 21 and to heat the fresh air admitted to the duct 10, I provide a heat exchange element or cooling coil 27 extending across the fresh air inlet 12. The coil 27 is arranged so that during the heating cycle it is connected between the condenser 21 and the liquid receiver 26 and thereby cools the liquid refrigerant before it enters the receiver. When the refrigerating machine is used to cool the air passing through the duct 10, the coil 27 is excluded from the refrigerant circuit.

When the refrigerating machine is being used to heat the air passing through the duct 10 refrigerant is discharged from the compressor 20 into a T-connection 28 and through a valve 29, which is open, to a conduit 30 connected to the condenser 21. A valve 31 at the lower end of the T-connection is closed during this operation. The hot compressed gaseous refrigerant is cooled in the condenser 21 by the passage of the mixed, fresh and withdrawn air thereover through the duct 10, the refrigerant is thereby liquefied, and the air is heated. The liquid refrigerant flows out through a connection 32 and thence to the heat exchanger 27 through a connection 33 and a check-valve 34, which opens for flow from left to right therethrough, as shown in the drawing. A check-valve 35 is closed as indicated and prevents the flow of refrigerant directly from the condenser to the receiver 26. The liquid refrigerant in the coil 27 is cooled by the circulation of fresh air through the intake 12 and flows out through a conduit 36 and into the liquid receiver 26. A check-valve 37 opens to admit the liquid refrigerant to a scale trap 38 and thence to a thermostatic expansion valve 39 which controls the flow of refrigerant to the evaporator 22; the valve 39 being provided with a thermostatic bulb 40 arranged at the outlet side of the coil of the evaporator 22. The liquid refrigerant is vaporized in the heat exchanger 22 by the circulation of air thereover through the duct 23 and the vaporized refrigerant is withdrawn from the evaporator through a conduit 41 and returns to the compressor 20 through an open valve 42 and a T-connection 43. A valve 44 at the upper end of the T-connection 43 is maintained closed during the heating operation.

When it is desired to cool the air passing through the duct 10, the refrigerating machine is reversed by reversing the valves 29, 31, 42 and 44. The remaining valves in the system operate automatically. During the cooling operation the compressed refrigerant is discharged from the compressor through the T-connection 28 and open valve 31 and flows through conduit 41 to the heat exchanger 22; here the compressed refrigerant is cooled and liquefied by the air passing through the duct 23. The liquid refrigerant flows from the coil 22 through a connection 45 and a check-valve 46 which by-pass the expansion valve 39, the scale trap 38, and the check-valve 37 which automatically closes during this operation. The liquid refrigerant collects in the receiver 26 and from thence flows through the check-valve 35 which opens and admits refrigerant to a scale trap 47 and thence through an expansion valve 48 and the connection 32 to the heat exchanger 21. The valve 34 is closed during this operation and prevents the passage of the liquid refrigerant through the heat exchanger 27. The liquid refrigerant in the coil 21 is vaporized upon absorption of heat from the air passing through the duct 10; the air is thereby cooled and the refrigerant vaporized. Expansion valve 48 is controlled in response to the temperature and pressure of vaporized refrigerant, a thermostatic element 49 being arranged in heat exchange relation with the discharge end of the coil 21. The vaporized refrigerant is withdrawn from the exchanger 21 through the conduit 30 and returns to the compressor 20 through the open valve 44 and the T-connection 43.

A pan 50 is provided at the bottom of the duct and during the heating operation this pan is filled with water in order to humidify the air passing through the duct. The water is preferably heated in order to increase the absorption thereof by the air.

The refrigerating system is, therefore, available either for heating or cooling the air passing through the duct 10. During the heating operation in the duct 10 the full capacity of the compressor is utilized to obtain a greater heating of the air passing through the duct without increasing the volume of refrigerant pumped. The effective capacity of the system is, therefore, increased. The heat exchanger 27 which preheats the fresh air admitted to the duct 10 is automatically excluded from the refrigerant circuit when the direction of flow of refrigerant through the circuit is reversed for the cooling operation in the duct 10.

The effect of the liquid cooler 27 in utilizing the full capacity of the compressor to obtain more available heat without requiring the pumping of a greater volume of gas can readily be understood on reference to Fig. 2 of the drawing, which shows a Mollier diagram illustrating the cycle of operation of the refrigerating machine. The normal operating cycle producing heating in the duct 10 without the liquid cooler 27 will be considered first, this is the cycle which would prevail if the liquid refrigerant were permitted to flow directly from the condenser 21 to the liquid receiver 26. Referring now to the diagram, beginning the cycle at the expansion valve 39, saturated liquid refrigerant at the condition corresponding to point A on the diagram on the liquid line is expanded through the valve from the point A to the point B on the back pressure line. Any liquid refrigerant not evaporated in passing from A to B will be vaporized as it passes through the evaporator 22. This vaporization takes place along the constant pressure line B—C and the vaporized refrigerant finally leaves the evaporator 22 at the point C which is somewhat superheated, it being above the saturation line indicated on the diagram. The vaporized refrigerant then enters the compressor and is compressed along the line C—D and at the point D is a high pressure high temperature gas. The high pressure gas then enters the condenser and is condensed along the line A—D at constant pressure becoming liquid at A and thereby completing the cycle. The amount of heat available at the points D, C and A has been indicated as X, Y and Z B. t. u./lb., respectively. The refrigerating effect is equal to Y—Z B. t. u./lb. of refrigerant pumped. The condenser 21 absorbs the heat of vaporization plus the heat of compression which is equal to X—Z B. t. u./lb. of refrigerant pumped.

During normal operation of any refrigerant condenser, there is some sub-cooling of the liquid in order to insure the absence of gas in the liquid as it passes through the expansion valve. However, a great amount of sub-cooling in the condenser is impossible because of the economical limits due to the temperature of the cooling medium flowing over the condenser. In the refrigerating system described above, the liquid sub-cooler is placed in such a position that the air passing thereover is substantially cooler than that passing over the condenser and, consequently, a substantial amount of sub-cooling can be effected. By sub-cooling, of course, is meant cooling along the liquid line indicated in Fig. 2. When using the sub-cooler the liquid is cooled from the point A to some point A' and the expansion will then take place from point A' to a point B' on the back pressure line, the refrigerant then being vaporized from B' to C, which is at the same point reached during the cycle not using the sub-cooler. The cycle is then completed by compression from C to D and condensation from D to A. It is obvious that the work done by the compressor remains the same since the gas taken in by the compressor is at the same condition whether or not the liquid sub-cooler is used. In other words, the compressor does not pump any more pounds of refrigerant per hour, nor any less pounds of refrigerant per hour. However, there is a net increase in the heat available for heating the air passing through the duct. This is evident since the amount of heat available under the condition A' and indicated at R is less than that available at Z. In other words, there is a net increase of Z—R B. t. u./lb. of refrigerant. The air passing through the duct 10 now absorbs X—R B. t. u./lb. of refrigerant passing through the condenser and the sub-cooler which represents a substantial increase over X—Z B. t. u./lb. of refrigerant. The refrigerating effect is also increased as represented by the line of Y—R and it is, therefore, necessary to provide a slightly larger evaporator surface.

From the foregoing, it is apparent I have provided an air conditioning system employing a reversible refrigerating machine for cooling and heating the air within an enclosure and which includes an improved arrangement for utilizing the full capacity of the compressor to obtain an increased heating capacity of the system.

While I have shown a particular embodiment of my invention in connection with an air conditioning system, I do not desire my invention to be limited thereto, and intend in the appended claims to cover all modifications within the spirit and scope of my invention.

What I claim as new and desire to secure by Letters Patent of the United States is:

1. In an air conditioning system a refrigerating machine including a condenser and an evaporator, means including a duct for circulating air over said condenser to heat said air, means for circulating cooling fluid over said evaporator, means including a heat exchange element arranged in front of said condenser for cooling refrigerant liquefied in said condenser and for heating air circulated through said duct prior to its passage over said condenser, means for reversing the refrigerant circuit of said refrigerating machine to cool the air passing through said duct, and means by-passing said heat exchange element for excluding said element from the circuit of said refrigerating machine when said circuit is reversed.

2. A system for heating the air within an enclosure including a duct, means for admitting to said duct air withdrawn from said enclosure, means for admitting to said duct fresh air from outside said enclosure, means for circulating the resultant mixture of fresh and withdrawn air through said duct and for discharging said mixture therefrom into said enclosure, means for compressing gaseous refrigerant, means including a heat exchange element arranged in said duct in the path of said mixture for condensing the gaseous refrigerant compressed in said compressing means and for heating the mixture of air circulated through said duct, means including a second heat exchange element arranged in the path of said fresh air for cooling the refrigerant liquefied in said condensing means and for heating said fresh air, and means including a heat exchange element arranged outside said duct for absorbing heat to vaporize said liquefied refrigerant and for returning said vaporized refrigerant to said compressor.

3. A system for heating the air within an enclosure including a duct, means for admitting to said duct air withdrawn from said enclosure, means for admitting to said duct fresh air from outside said enclosure, means for circulating the resultant mixture of fresh and withdrawn air through said duct and for discharging the mixture therefrom into said enclosure, means including a refrigerating machine comprising a compressor and a condenser and an evaporator arranged in a closed refrigerant circuit for heating said mixture of air, said condenser being arranged within said duct, means including a liquid receiver arranged in said refrigerant circuit for collecting liquid refrigerant condensed in said condenser, and means including a coil arranged in said refrigerant circuit between said liquid receiver and said condenser and utilizing the heat of the liquid refrigerant for preheating the fesh air admitted to said duct.

4. A system for conditioning the air within an enclosure including a duct, means for admitting air to said duct, means for circulating air through said duct and for discharging air therefrom into said enclosure, means for compressing gaseous refrigerant, means including a heat exchange element arranged in said duct for condensing the gaseous refrigerant compressed in said compressing means and for heating the air circulated through said duct, means including a second heat exchange element arranged in said duct for cooling the refrigerant liquefied in said condensing means, a portion of the air flowing through said duct passing first over said second heat exchange element and then over said first-mentioned heat exchange element, means including a heat exchange element arranged outside said duct for absorbing heat to vaporize said liquefied refrigerant and for returning said vaporized refrigerant to said compressor, means for reversing the direction of flow of said refrigerant through said condensing means and through said heat absorbing means for cooling the air passing through said duct, and means by-passing said second heat exchange element for preventing the flow of refrigerant through said second element when the direction of flow of refrigerant is reversed.

5. A system for conditioning the air within an enclosure including a duct, means for admitting to said duct fresh air from outside said enclosure, means for circulating air through said duct and for discharging air therefrom into said enclosure, means for compressing gaseous refrigerant, means including a heat exchange element arranged in said duct for condensing the gaseous refrigerant compressed in said compressing means and for heating the air circulated through said duct, means including a second heat exchange element arranged in said fresh air admitting means for cooling the refrigerant liquefied in said condensing means, means including a heat exchange element arranged outside said duct for absorbing heat to vaporize said liquefied refrigerant and for returning said vaporized refrigerant to said compressor, means reversing the direction of flow of said refrigerant through said condensing means and through said heat absorbing means for cooling the air passing through said duct, and means by-passing said second heat exchange element for preventing the flow of refrigerant through said second element when the direction of flow of refrigerant is reversed.

6. A system for conditioning the air within an enclosure including a duct, means for admitting to said duct air withdrawn from said enclosure, means for admitting to said duct fresh air from outside said enclosure, means for circulating the resultant mixture of fresh and withdrawn air through said duct and for discharging said mixture therefrom into said enclosure, means for compressing gaseous refrigerant, means including a heat exchange element arranged in said duct in the path of said mixture of air for condensing the gaseous refrigerant compressed in said compressing means and for heating the mixture of air circulated through said duct, means including a second heat exchange element arranged in the path of said fresh air for cooling the refrigerant liquefied in said condensing means and for heating said fresh air, means including a heat exchange element arranged outside said duct for absorbing heat to vaporize said liquefied refrigerant and for returning said vaporized refrigerant to said compressor, means for reversing the flow of refrigerant through said first-mentioned heat exchange element and through said heat absorbing means to cool said mixture of air, and means by-passing said second heat exchange element for preventing the flow of refrigerant through said second element when the direction of flow of refrigerant is reversed.

7. A system for conditioning the air within an enclosure including a duct, means for admitting to said duct air withdrawn from said enclosure, means for admitting to said duct fresh air from outside said enclosure, means for circulating the resultant mixture of fresh and withdrawn air through said duct and for discharging said mixture therefrom into said enclosure, means including a refrigerating machine comprising a compressor and a condenser and an evaporator arranged in a closed refrigerant circuit for heating said mixture of air, said condenser being arranged within said duct, means including a liquid receiver arranged in said refrigerant circuit for collecting liquid refrigerant condensed in said condenser, means including a coil arranged in said refrigerant circuit between said liquid receiver and said condenser and utilizing the heat of the liquid refrigerant for preheating the fresh air admitted to said duct, means for reversing the refrigerant circuit of said refrigerating machine to cool said mixture of air passing through said duct, and means by-passing said coil for excluding said coil from the circuit of said refrigerant machine when said circuit is reversed.

OLAF M. OLSON.